(12) United States Patent
Imamura et al.

(10) Patent No.: US 7,318,971 B2
(45) Date of Patent: Jan. 15, 2008

(54) FUEL CELL SYSTEM UTILIZING CONTROL OF OPERATING CURRENT TO ADJUST MOISTURE CONTENT WITHIN FUEL CELL

(75) Inventors: Tomonori Imamura, Nagoya (JP); Hideshi Izuhara, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 707 days.

(21) Appl. No.: 10/776,621

(22) Filed: Feb. 12, 2004

(65) Prior Publication Data

US 2004/0166387 A1    Aug. 26, 2004

(30) Foreign Application Priority Data

Feb. 14, 2003   (JP)  ............................. 2003-036762

(51) Int. Cl.
*H01M 8/04*    (2006.01)
(52) U.S. Cl. .......................................... 429/23; 429/22
(58) Field of Classification Search ................ None
See application file for complete search history.

(56) References Cited

U.S. PATENT DOCUMENTS

2001/0028970 A1   10/2001   Sano et al.
2002/0012823 A1   1/2002   Komiya et al.

FOREIGN PATENT DOCUMENTS

| JP | A 2000-40519 | 2/2000 |
| JP | A 2001-256988 | 9/2001 |
| JP | A 2002-15759 | 1/2002 |
| JP | A 2002-110211 | 4/2002 |
| JP | 2002-246053 | * 8/2002 |

* cited by examiner

*Primary Examiner*—Jonathan Crepeau
(74) *Attorney, Agent, or Firm*—Oliff & Berridge, PLC

(57) ABSTRACT

In a fuel cell system utilizing fuel cells which generate electric power by a reaction between oxygen and hydrogen, the moisture content within a fuel cell is adjusted to be brought within an appropriate range by adjusting the operating current of the fuel cell. The total amount of electric power generated by the system is maintained at a required value by supplying/obtaining electric power to/from a secondary battery as required, or by utilizing a plurality of separately controlled fuel cells (or fuel cell stacks) and increasing or decreasing the electric power generated by another fuel cell or stack that is currently operating with an appropriate moisture content.

10 Claims, 12 Drawing Sheets

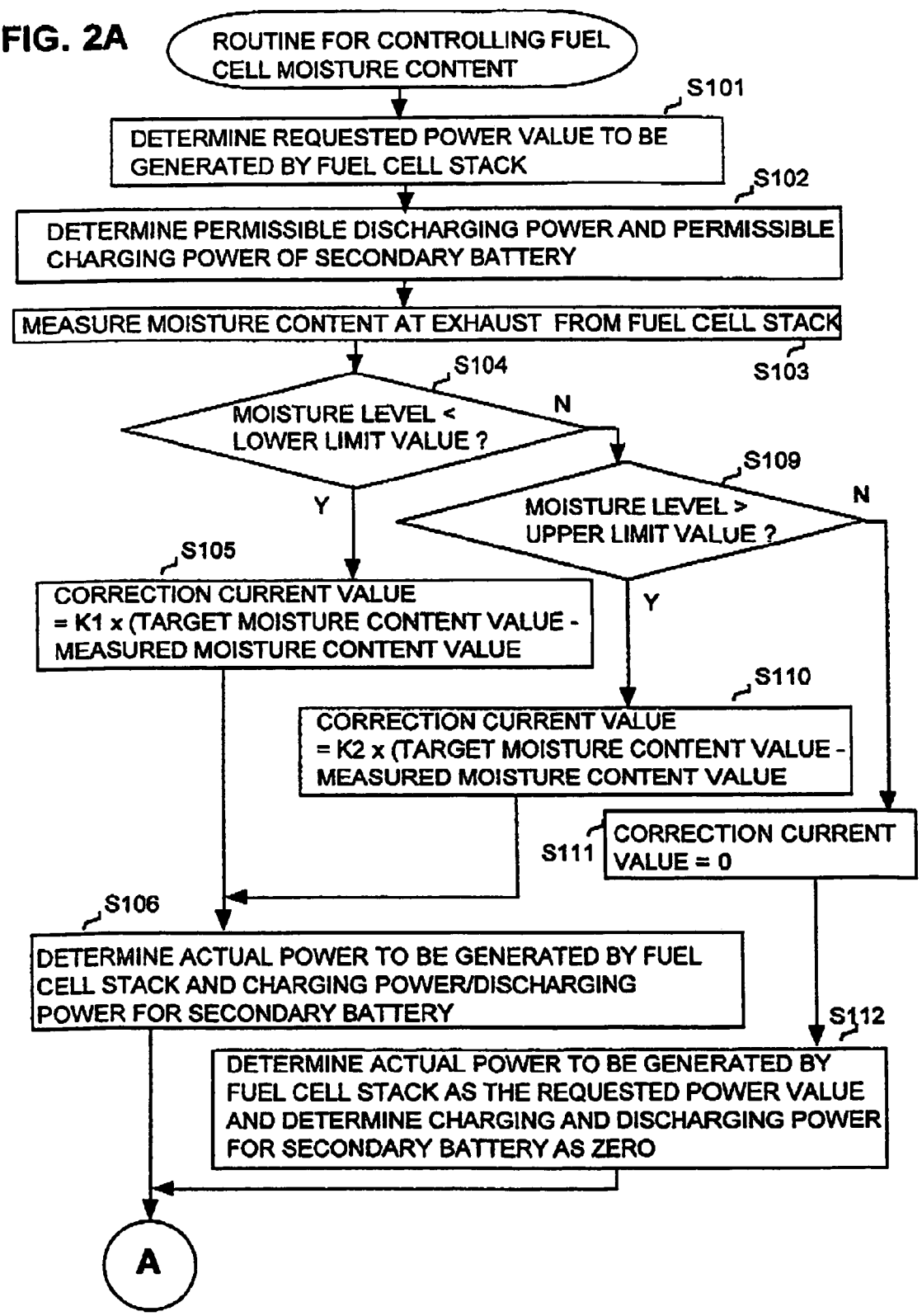

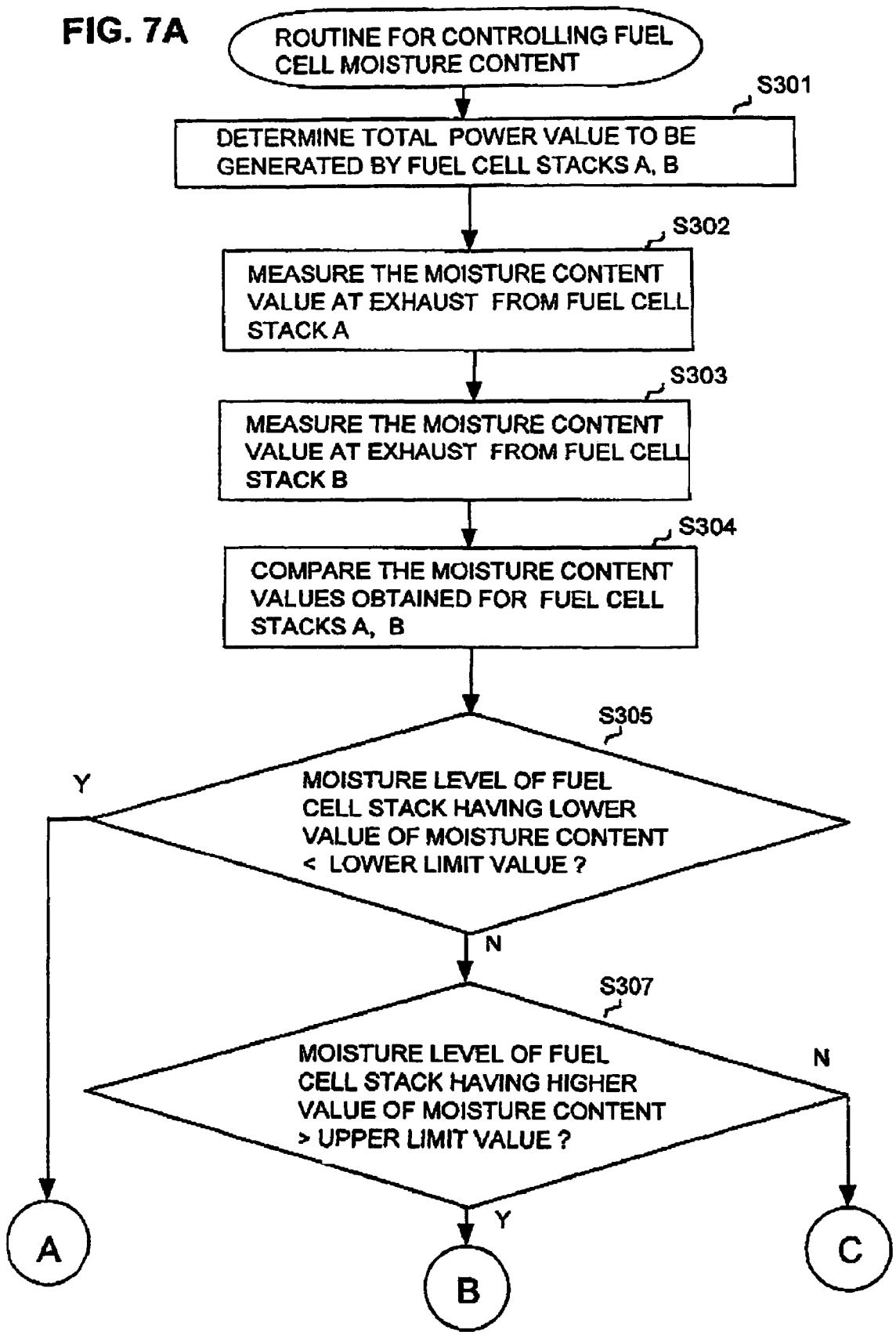

FUEL CELL SYSTEM UTILIZING CONTROL OF OPERATING CURRENT TO ADJUST MOISTURE CONTENT WITHIN FUEL CELL

FIELD OF APPLICATION

The present invention relates to a fuel cell system having fuel cells which generate power by a chemical reaction between oxygen and hydrogen, and which is suitable as a mobile electrical generator for vehicles, ships, etc., as a portable electrical generator, or as a small-scale to domestic electrical generator.

RELATED PRIOR ART

When a fuel cell is in operation, if there is an insufficient amount of water contained in the solid electrolyte membrane of the cell, then the conductivity of the solid electrolyte membrane is lowered, so that the level of electric power produced from the fuel cell is lowered. Conversely, if there is an excessive amount of water contained in the anode and cathode electrodes, then this obstructs the electrochemical reactions which occur at the surfaces of these electrodes, so that this also causes the level of electric power produced from the fuel cell to be lowered.

With one prior art type of fuel cell system, when a water blockage occurs in a fuel cell, control is applied whereby the electrical load on the cell varies in a pulsating manner. As a result of these pulsations, water is ejected from the cell (for example as described in Japanese patent 2002-110211).

With such a prior art system, it is possible to temporarily discharge excess water. However when such a prior art method is applied, since the rate at which water is generated within the fuel cell does not decrease, it is difficult to dry the interior of the fuel cell. Furthermore with such a prior art fuel cell system, no consideration is given to the problem of preventing excessive drying of the interior of the fuel cell, and so it is not possible to continuously maintain the fuel cell in a suitable condition of internal moisture.

SUMMARY OF THE INVENTION

It is an objective of the present invention to overcome the above problems of the prior art, by providing a fuel cell system for electric power generation, whereby the moisture status in the interior of a fuel cell is controlled to be maintained at an optimum condition. In the following and in the appended claims, the term "fuel cell generation section" is used to signify an electric power generation device that may be constituted by either a single fuel cell or by a fuel cell stack (i.e., battery of series-connected fuel cells). The term "secondary battery" is used in the sense of a rechargeable electric battery.

The essential features of the invention are as follows. In a fuel cell system, the moisture condition within a fuel cell generating section is monitored, to detect when the moisture content value rises above or falls below a range of values for which efficient operation is ensured. When it is found that the moisture content is excessive, then control is applied to decrease the operating current, i.e., the electric current generated by that fuel cell generating section, to thereby decrease the rate of generation of water within it. Conversely, when it is found that the moisture content is insufficient, then control is applied to decrease the value of electric current generated by that fuel cell generating section, to thereby increase the rate of generation of water within it. In either case, control is continued until the moisture content within the fuel cell generating section attains an appropriate level. That level may be defined between predetermined upper and lower limit values of moisture content.

It is a basic feature of such a system that it is configured to continuously generate electric power (referred to in the following simply as "power") at a specific required value, irrespective of such adjustments in fuel cell current.

According to one basic aspect of the invention, the system includes an electrical energy storage device such as a secondary battery or a capacitor, in addition to a fuel cell generating section. The system operates such that when the operating current of the fuel cell generating section is increased in order to increase the moisture content within that fuel cell, the resultant increase in power is compensated by supplying part of the power produced by that fuel cell generating section to charge the electrical energy storage device. Conversely, when the operating current of the fuel cell generating section is decreased, to decrease the moisture content, the resultant decrease in power is compensated by supplying power produced by the electrical energy storage device to supplement the power produced by the fuel cell generating section.

According to another basic aspect of the invention, the system includes a plurality of respectively separately controlled fuel cell generating sections whose combined total generated power constitutes the power from the system. In that case, when it is found that the moisture content within one of the separately controlled fuel cell generating sections is below a predetermined lower limit value, and so the operating current of that fuel cell generating section is increased in order to increase its internal moisture content, then the operating current of at least one other of the fuel cell generating sections, whose moisture content is not below the lower limit value, is decreased accordingly. That amount of decrease in operating current is determined such that the combined power of the separately controlled fuel cell generating sections is maintained at a required value.

Conversely, when it is found that the moisture content within one of the separately controlled fuel cell generating sections is above a predetermined upper limit value, and so the operating current of that fuel cell generating section is decreased in order to decrease its internal moisture content, then the operating current of at least one other of the fuel cell generating sections, whose moisture content is not above the upper limit value, is increased accordingly. In that case, the amount of increase in operating current is determined such that the combined power of the separately controlled fuel cell generating sections is maintained at a required value.

More specifically, the invention provides a fuel cell system having a fuel cell generating section constituted by at least one fuel cell, for generating power by an electrochemical reaction between a fuel gas containing hydrogen and an oxidizing gas containing oxygen, fuel gas supply means for supplying a flow of fuel gas to the fuel cell generating section and oxidizing gas supply means for supplying a flow of oxidizing gas to the fuel cell generating section. Such a system is characterized in further comprising a controllable power source which may be an energy storage device or one or more other fuel cells or batteries of fuel cells, and in control means for:

(a) controlling the moisture condition within the fuel cell generating section by adjusting the value of electric current at which the fuel cell generating section operates, i.e., by increasing the current in order to accordingly increase the rate of generation of water within the fuel cell generating section when necessary, and decreasing the current to accordingly decrease the rate of generation of water to thereby promote drying of the interior of the fuel cell generating section, when necessary, and (b) when such a current adjustment has been performed, adjusting the amount of power generated by the controllable power source such as to maintain the total amount of power generated by the system at a required value.

To judge the moisture content condition of the fuel cell generating section, such a system includes moisture diagnosis means. This can, for example, be constituted by a sensor which detects the level of moisture in a flow of exhaust gas (air or hydrogen) that is outputted from the fuel cell generating section.

Furthermore such a cell system preferably includes memory means which stores data expressing a plurality of characteristics corresponding to respectively different values of moisture content of a fuel cell generating section, with each characteristic expressing a relationship between values of electric current generated by the fuel cell generating section and corresponding values of power generated by the fuel cell generating section, under a specific condition of moisture content within the fuel cell generating section. In that case, the control means operates to read out from the memory means a characteristic that is selected as corresponding to a moisture content value which is derived based on the moisture content diagnosis results obtained for the fuel cell generating section.

When a specified value of electric current is to be generated by the fuel cell generating section, that current value is applied to obtain a corresponding value of power from the selected characteristic, i.e., as a value of power that is to be generated by the fuel cell generating section. Conversely, when a specified value of power is to be generated by the fuel cell generating section, that value of power is applied to the selected characteristic, to obtain a corresponding value of electric current, i.e., as a value of electric current that is to be generated by the fuel cell generating section in order to produce the specified value of power.

Such a fuel cell system may comprise an electrical energy storage device to constitute the controllable power source, with the control means operating to apply a part of the power generated by the fuel cell generating section to charge the electrical energy storage means when the aforementioned first condition is detected and for discharging the electrical energy storage means to supplement the power generated by the fuel cell generating section when the aforementioned second condition is detected.

Alternatively, such a fuel cell system may comprise a plurality of fuel cell generating sections each formed of at least one fuel cell, fuel gas supply means for supplying a flow of fuel gas to each of the fuel cell generating sections, and oxidizing gas supply means for supplying a flow of oxidizing gas to each of the fuel cell generating sections, and moisture diagnosis means for diagnosing respective moisture content conditions of the fuel cell generating sections.

With such a system, the control means can operate to judge the results obtained by the moisture diagnosis means, to determine the fuel cell generating section having the lowest value of moisture content of all of the fuel cell generating sections, judge whether the lowest value of moisture content is below a predetermined lower limit value, and when the moisture content value is found to be below the lower limit value, increase the electric current generated by the fuel cell generating section having the lowest value of moisture content, until the moisture content value is within a predetermined range of values.

Similarly, the control means operates to judge the results obtained by the moisture diagnosis means, to determine the fuel cell generating section having the highest value of moisture content of all of the fuel cell generating sections, judge whether the highest value of moisture content exceeds a predetermined upper limit value, and when the moisture content value is found to exceed the upper limit value, apply control to decrease the electric current generated by the fuel cell generating section having the highest value of moisture content, until the moisture content value is within the predetermined range of values.

Furthermore when such adjustment has been applied to the value of electric current generated by the fuel cell generating section having the highest or lowest value of moisture content, the control means then applies control to increase or decrease the value of electric current generated by at least one other of the fuel cell generating sections, in a direction such as to adjust the total value of power generated by the system towards the required value.

As a further alternative, when such a fuel cell system is formed with a plurality of fuel cell generating sections and control means for mutually separately controlling respective values of electric current generated by the fuel cell generating sections, and moisture diagnosis means for diagnosing respective moisture content conditions of the fuel cell generating sections, the system may be configured with fuel gas supply means for supplying a flow of fuel gas to each of the fuel cell generating sections along a hydrogen flow path, oxidizing gas supply means for supplying a flow of oxidizing gas to each of the fuel cell generating sections along an air flow path, with the plurality of fuel cell generating sections being disposed in series along at least one of the air flow path and the hydrogen flow path.

With such a system, the control means serves to control the value of electric current produced by a first one of the fuel cell generating sections in accordance with results obtained by the moisture diagnosis means for a second one of the fuel cell generating sections, i.e., where the first one of the fuel cell generating sections is located upstream with respect to the second one of the fuel cell generating sections along the air flow path and/or hydrogen flow path in which the fuel cell generating sections are connected in series.

Thus for example in a system having two fuel cell generating sections, the flow of exhaust air (or exhaust hydrogen) produced from a first one of the fuel cell generating sections (i.e., which receives flows of air and hydrogen directly from respective sources) is supplied as a flow of oxygen-containing gas (or fuel-containing gas) to the second fuel cell generating section. In that way, the water which is generated within the first fuel cell generating section can be utilized to increase the moisture content within the second fuel cell generating section, when that moisture content becomes insufficient, i.e., falls below a predetermined lower limit value.

BRIEF DESCRIPTION OF THE DRAWINGS

FIGS. 2A, 2B constitute a flow diagram of a control routine that is periodically executed by a control section of the first embodiment;

FIGS. 7A, 7B constitute a flow diagram of a control routine that is periodically executed by a control section of the second embodiment;

DESCRIPTION OF PREFERRED EMBODIMENTS

First Embodiment

Figure 1:
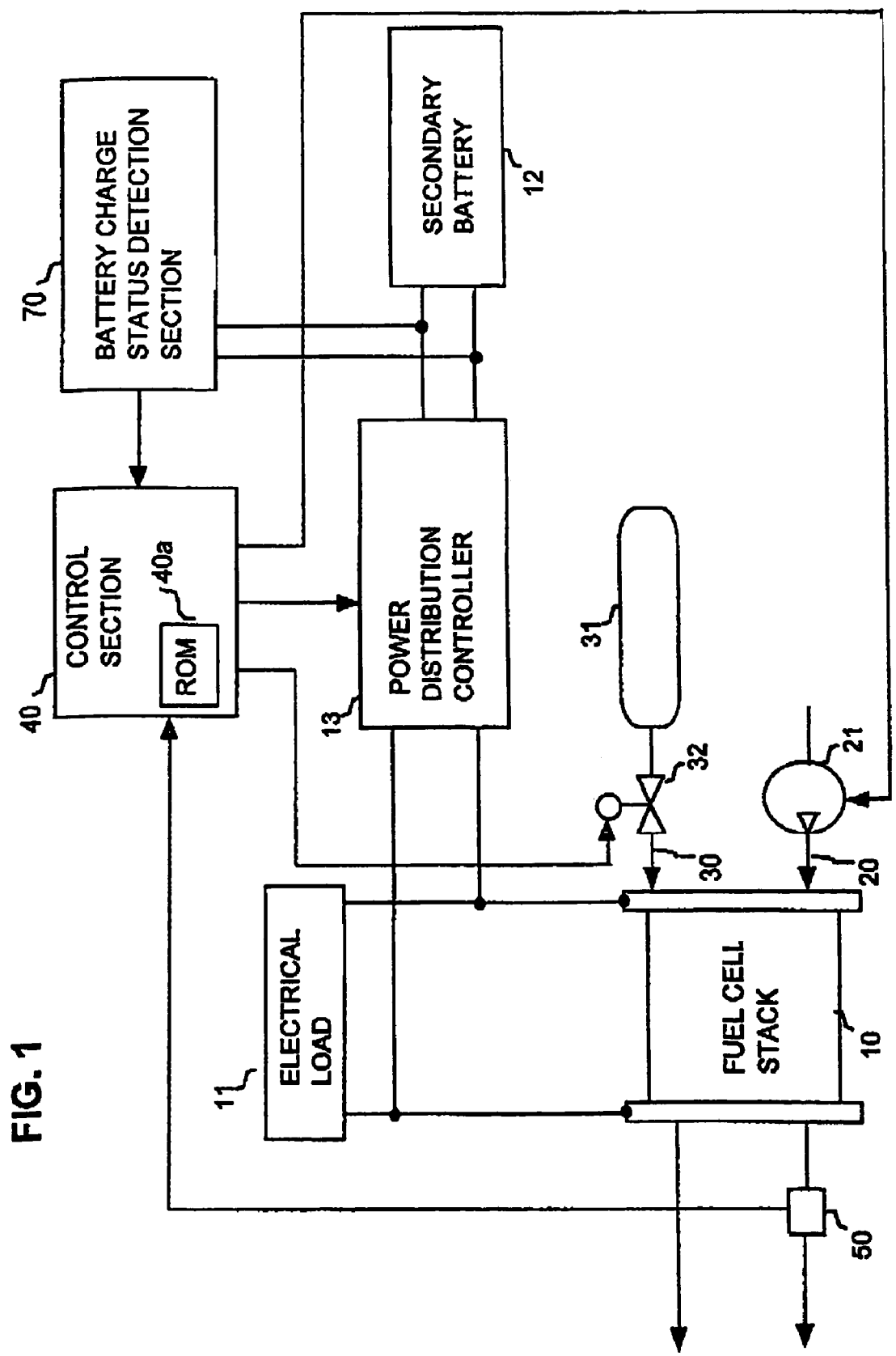
FIG. 1 is a conceptual system diagram of a first embodiment of a fuel cell system, utilizing a secondary battery.

A first embodiment will be described referring to FIGS. 1 to 5. This embodiment is a fuel cell system that is utilized as the motive power source of an electric vehicle. FIG. 1 is a conceptual system diagram showing the overall configuration of the embodiment. As shown in FIG. 1, the system is based on a fuel cell stack (i.e., battery of series-connected fuel cells) 10, which generates power by an electrochemical reaction between hydrogen and oxygen. With this embodiment, a polymer fuel cell is used for each of the series-connected fuel cells of the fuel cell stack 10. Each of these fuel cells is made up of a pair of electrodes with an electrolyte membrane sandwiched between them. By supplying hydrogen and oxygen (i.e., as air) to the fuel cell stack 10, electrical energy is generated by the aforementioned electrochemical reaction. The reactions which occur at the respective electrodes are as follows:

At the hydrogen side: 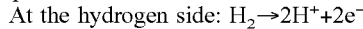
At the oxygen side: 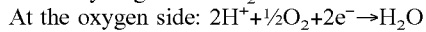

The power that is generated by the fuel cell stack 10 is supplied to an electrical load 11, i.e., which consumes electrical energy, and to a secondary battery 12, which stores electrical energy.

A power distribution controller 13 operates under the control of a control section 40, which performs overall control of the system operation. The power distribution controller 13 is responsive to commands supplied from the control section 40 for controlling the amounts of charging power and discharging power for the secondary battery 12 (i.e., for a condition in which the secondary battery 12 is being charged by power from the fuel cell stack 10, and a condition in which the secondary battery 12 is supplying power to the electrical load 11 to supplement the power generated by the fuel cell stack 10, respectively), and controlling the operating current of the fuel cell stack 10 and so controlling the value of power generated thereby. That value of power is determined by the control section 40 based on the amount of power that is to be supplied to the electrical load 11 and any additional amount of power that must be supplied for charging the secondary battery 12, as described hereinafter.

With this embodiment, the electrical load 11 is an electric motor that produces motive power to drive the vehicle.

A flow of oxygen is supplied (as air) to the oxygen-side electrode (i.e., the positive electrode) of the fuel cell stack 10 through an air flow path 20, while a flow of hydrogen is supplied as a fuel gas to the hydrogen-side electrode (i.e., the negative electrode) of the fuel cell stack 10 through a hydrogen flow path 30. An air compressor 21 is disposed in an upstream part of the air flow path 20, for supplying a flow of air along the air flow path 20. The rate of supply of air (and hence, of oxygen) to the fuel cell stack 10 is adjusted by control of the speed of rotation of the compressor 21, performed by the control section 40.

A hydrogen gas cylinder 31 which contains hydrogen under high pressure is disposed in the hydrogen flow path 30, upstream from the fuel cell stack 10, for supplying a flow of hydrogen, with the rate of supply being controlled by a flow rate adjustment valve 32 that is located in the hydrogen flow path 30 between the hydrogen gas cylinder 31 and the fuel cell stack 10.

It should be noted that it would be equally possible to provide some other arrangement for supplying a flow of hydrogen, other than the hydrogen gas cylinder 31, such as a tank containing pure hydrogen that is absorbed in a hydrogen-absorbing metal alloy, etc.

The embodiment further includes a moisture amount sensor 50, for producing a sensor signal indicative of the moisture content within the interiors of the cells of the fuel cell stack 10. The moisture amount sensor 50 is disposed in the air exhaust path of the fuel cell stack 10. The sensor signal produced by the moisture amount sensor 50 is received by the control section 40, which diagnoses the moisture content in the interior of the fuel call stack 10 based on that sensor signal.

The control section 40 also applies various types of control as described in the following. In addition, the control section 40 receives input signals supplied from various sensors of the vehicle (not shown in the drawings), including an accelerator opening degree sensor (i.e., a sensor which produces a signal indicative of the degree to which the accelerator pedal of the vehicle is currently being actuated by the driver of the vehicle, and so effectively constitutes an acceleration command signal for the vehicle), and the control section 40 calculates the amount of power that must be supplied to the electrical load 11, based on these sensor signals.

The control section 40 is further configured to produce control signals for controlling the compressor 21, the flow rate adjustment valve 32, a power distribution controller 13, etc., as described hereinafter. The control section 40 moreover includes a ROM (read-only memory) 40a, having data stored beforehand therein which express a plurality of characteristics, with the characteristics corresponding to respectively different values of moisture content of the fuel cell stack 10, and with each characteristic expressing a relationship between values of current produced by the fuel cell stack 10 and corresponding values of power generated by the fuel cell stack 10 when it is operating at a specific moisture content value (as measured based on the sensor signal from the moisture amount sensor 50).

In addition, a battery charge status detection section 70 is coupled to the secondary battery 12, for monitoring the state of charge of the secondary battery 12, and for thereby obtaining information indicating the permissible amount of power that can be applied (from the fuel cell stack 10) to charge the secondary battery 12 and information indicating the permissible amount of power that can be supplied (by discharging the secondary battery 12) to the electrical load 11 for supplementing the power produced from the fuel cell stack 10.

Moisture content control, for maintaining the interiors of the cells of the fuel cell stack 10 (referred to in the following simply as the interior of the fuel cell stack 10) at an optimum moisture condition (i.e., within a predetermined range of values of moisture content) is performed by controlling the operating current of the fuel cell stack 10, with that control being performed by the control section 40 acting through the power distribution controller 13.

It will be apparent that the processing and control functions of the control section 40 can readily be implemented by a circuit based on a microprocessor which operates under a suitable control program, as is well known in the art, so that description of the internal configuration of the control section 40 is omitted.

The operation will be described referring first to FIGS. 2A, 2B, which constitute a flow diagram of a control routine that is executed repetitively by the control section 40 at fixed intervals, for controlling the level of current produced by the fuel cell stack 10 such as to maintain the interior of the fuel cell stack 10 at a suitable condition of moisture content. The fuel cell stacks 10A, 10B are respectively designated in the flow diagram simply as fuel cell stack A and fuel cell stack B.

In the following, the maximum permissible value of a parameter will be referred to simply as the permissible value for that parameter.

Firstly (step S101) the level of power that is to be supplied to the electrical load 11 is determined, based on the signals from the accelerator opening degree sensor, etc. Next, in step S102, the permissible value of power that can be applied to charge and discharge the secondary battery 12 is determined (using information from the battery charge status detection section 70) with that value being referred to in the following as the permissible charging power, and the permissible value of power that can be supplied by discharging the secondary battery 12 is also determined, with that value being referred to in the following as the permissible discharging power.

Specifically, the battery charge status detection section 70 notifies the control section 40 of the state of charge of the secondary battery 12. To obtain the permissible charging (and discharging) power, the control section 40 uses the information from the battery charge status detection section 70 to determine an appropriate charging voltage, and the maximum charging current that can be supplied to the secondary battery 12, with that combination of voltage and current constituting the "maximum charging power" value. Similarly, the "maximum discharging power" is obtained by the control section 40 as the voltage of the secondary battery 12 and the maximum level of discharge current that the secondary battery 12 can supply, at that time.

Next in step S103, the moisture content of the fuel cell stack 10 (i.e. indicative of the moisture content within the cells of the fuel cell stack 10) is then obtained based on the detection signal supplied from the moisture amount sensor 50. A decision is then made (step S104) as to whether or not the moisture content is below a predetermined lower limit value. If the moisture content is found to be below the limit value (i.e., a Y decision in step S104) indicating that the moisture content in the fuel cells is insufficient, then a correction current value is calculated (step S105), using the equation shown for step S105.

Specifically, a target value of moisture content is established, between the aforementioned lower limit value and an upper limit value. If the actual moisture content is found to be insufficient, in step S104, then the correction current value is calculated as a (positive) value of additional current that is to be produced by the fuel cell stack 10, to thereby cause the rate of production of water within the fuel cell stack 10 to be increased by an appropriate amount, and thereby bring the actual moisture content in the interior of the fuel cell stack 10 towards the target value.

If it is found in step S104 that the moisture content of the fuel cell stack 10 is not insufficient (i.e., N decision) then step S109 is executed to judge whether or not the moisture content is above the aforementioned upper limit value. If the moisture content is found to exceed that value (a Y decision in step S109) then step S110 is executed, in which a correction current value is calculated as a negative value, expressing a required reduction of the current produced by the fuel cell stack 10 to thereby cause the rate of production of water within the fuel cell stack 10 to be decreased by an appropriate amount, and thereby bring the actual moisture content in the interior of the fuel cell stack 10 towards the target value.

If the moisture content of the fuel cell stack 10 is found to be satisfactory (a N decision in step S109) then the correction current value is set as zero (step S111), so that the actual power to be generated by the fuel cell stack 10 is set as being the requested power value (specified in step S101) and the amount of charging/recharging power for the secondary battery 12 is set as zero (step S112).

Following execution of step S105 or S110, step S106 is executed, in which the actual value of power to be generated by the fuel cell stack 10 (taking into account the correction current value that has been calculated in step S105 or S110) and value of power to be obtained by discharge from the secondary battery 12 (if there has been a Y decision in step S109) are respectively determined.

Following step S106 or S112, control is applied (step S107) whereby, based on the values obtained in step S106 or S112, the fuel cell stack 10 generates the determined actual power value, and whereby an appropriate level of power (supplied from the fuel cell stack 10) is applied by the power distribution controller 13 for charging the secondary battery 12, or an appropriate level of power is obtained by discharge from the secondary battery 12 (and supplied by the power distribution controller 13 to the electrical load 11).

Figure 2B:
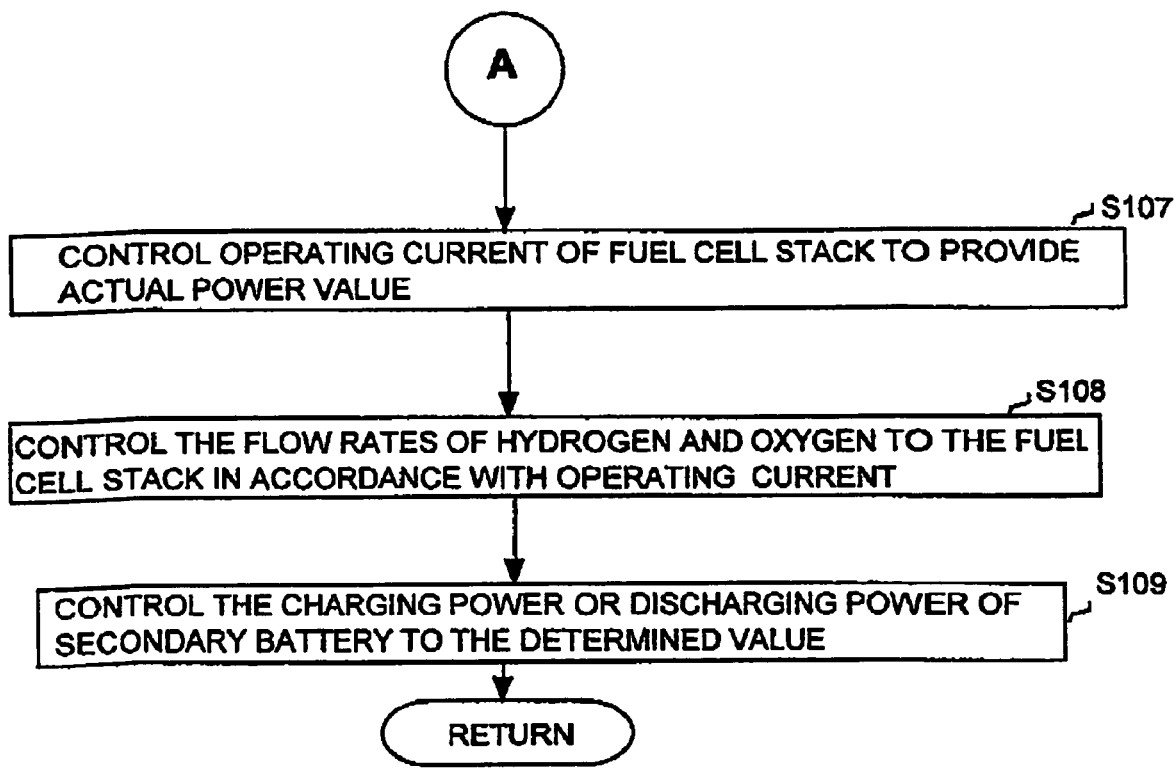
Figure 3A:
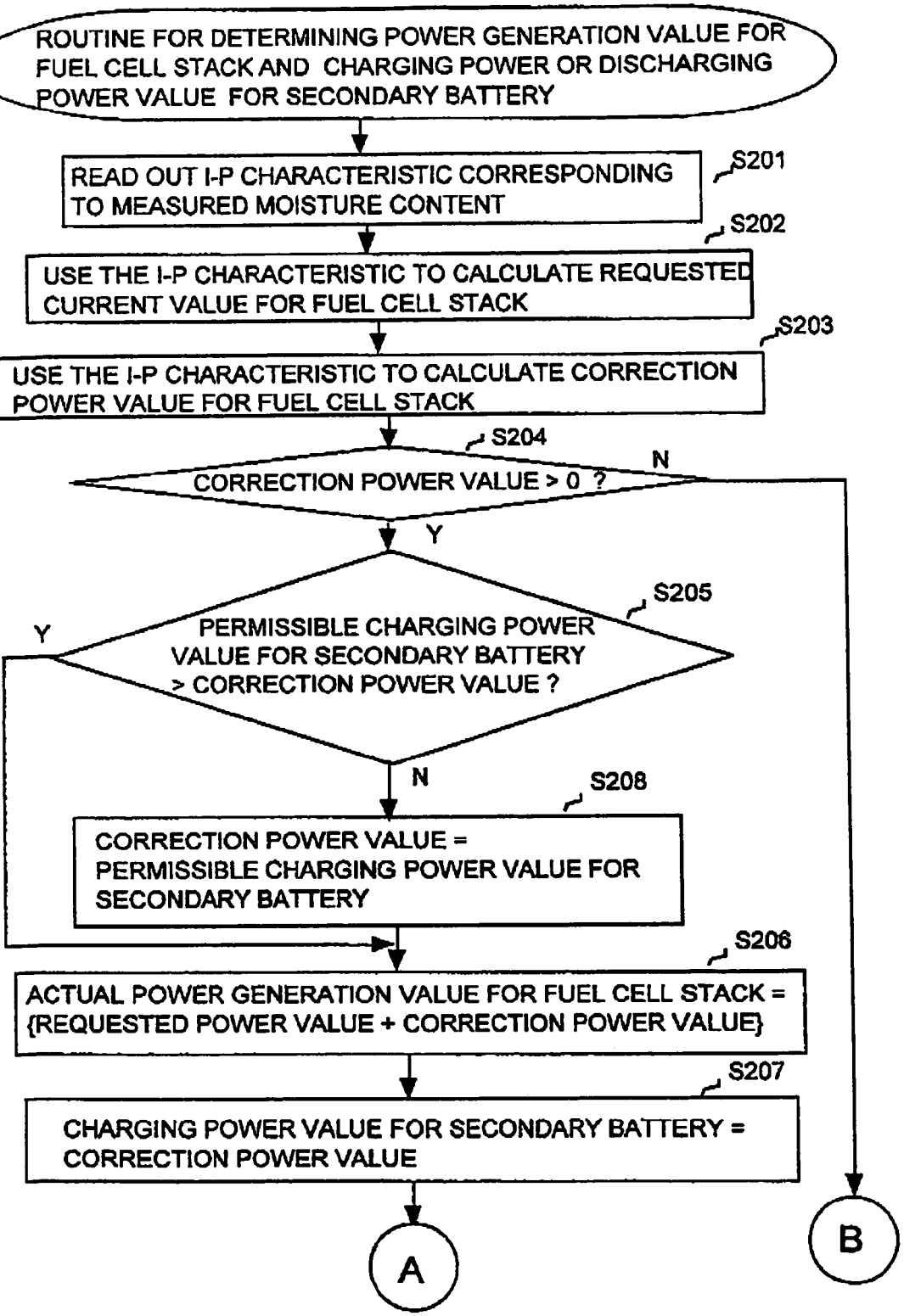
FIGS. 3A, 3B constitute a flow diagram of a subroutine within the flow diagram of FIGS. 2A, 2B.
Figure 3B:
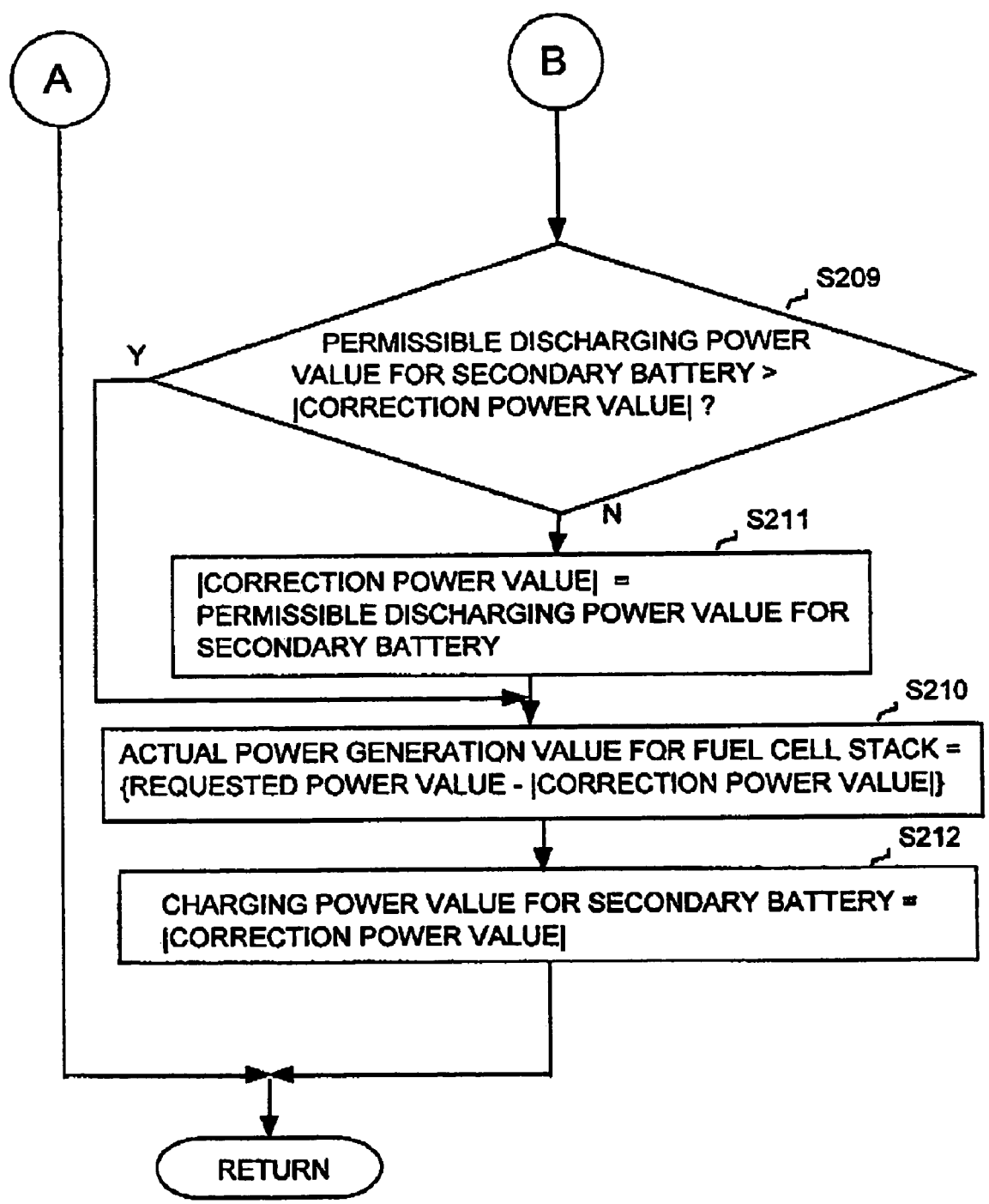
Figure 4:
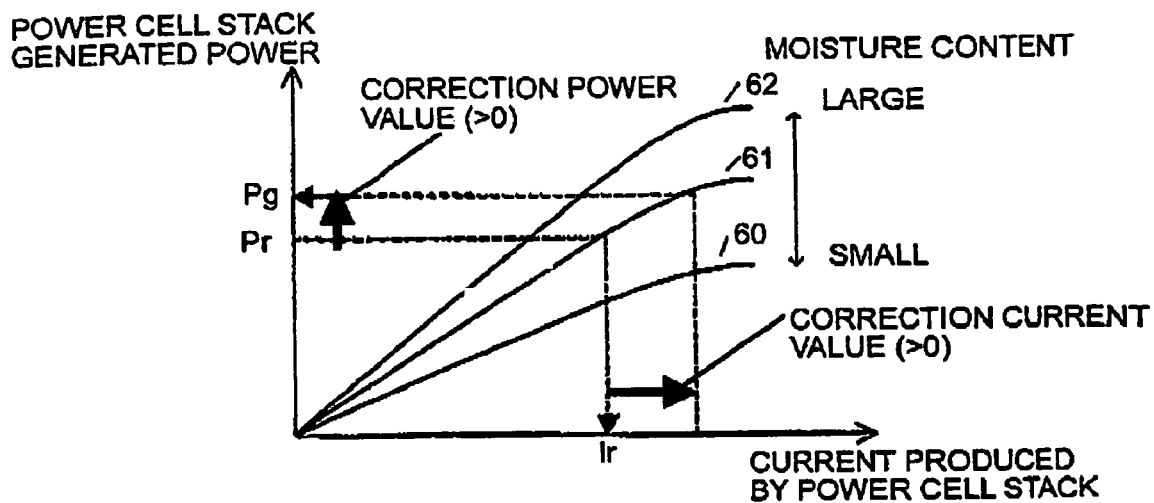
FIGS. 4 and 5 are graphs illustrating characteristics expressing relationships between values of operating current of a fuel cell stack and corresponding values of power generated by the stack, under respectively different conditions of moisture content within the stack.
Figure 5:
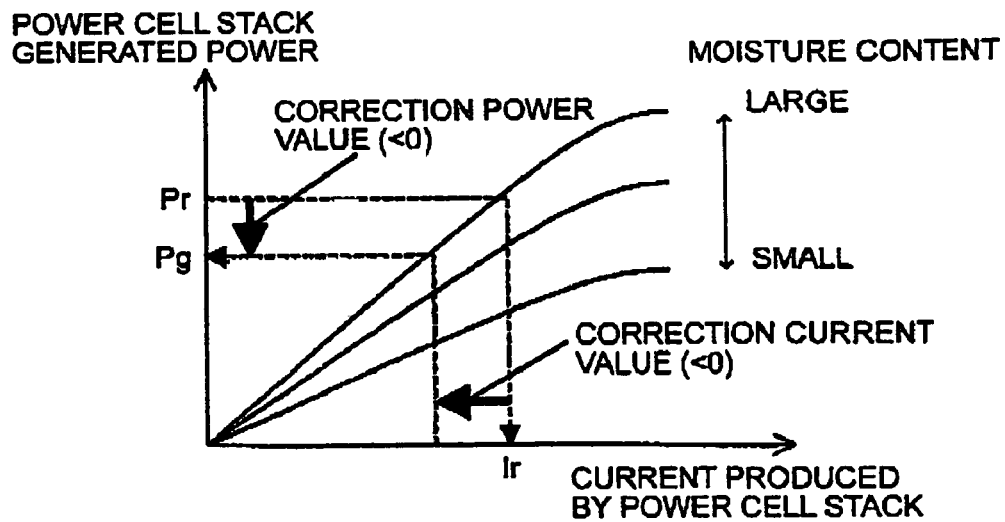

FIGS. 3A, 3B in combination are a flow diagram of a subroutine which constitutes step S106 of FIGS. 2A, 2B. In FIGS. 3A, 3B firstly (step S201) data expressing a fuel cell I-P (current-power) characteristic for the fuel cell stack 10, which has been stored beforehand in the ROM 40a of the control section 40, is read out from ROM 40a. As illustrated in the graphs of FIGS. 4, 5 there are a plurality of such fuel cell I-P characteristics which have been stored beforehand in the ROM 40a, with each I-P characteristic corresponding to a specific level of moisture content of the fuel cell stack 10. Each characteristic shows a relationship between values of current produced by the fuel cell stack 10 and corresponding values of power generated by the fuel cell stack 10, when operating with the corresponding level of moisture content. Here, the term "level of moisture content" signifies a parameter value that is obtained by the control section 40, based on judgement of the sensor signal supplied from the moisture amount sensor 50 as described above.

The I-P characteristic which is read out at this time is selected as corresponding to the moisture content value that has been measured in step S103 of FIGS. 2A, 2B described above. In FIG. 4, which illustrates a case when there is insufficient moisture content (so that the correction current value is positive), the three I-P characteristics 60, 61 and 62 respectively correspond to successively increasing levels of moisture content in the fuel cell stack 10. It is assumed that the measured moisture content value corresponds to the I-P characteristic 61. Designating the power value required for driving the load 11 (determined in step S101 of FIGS. 2A, 2B) as Pr and referred to in the following as the requested power value, a corresponding requested value of current to be produced by the fuel cell stack 10 is obtained from the characteristic 61, with that requested current value indicated as Ir. That current Ir is then increased by the correction current value (as indicated by the horizontal arrow line), so that the total current to be produced by the fuel cell stack 10 is thereby established. Applying that total current value back to the characteristic 61 as illustrated in FIG. 4, the actual value of power that must be generated by the fuel cell stack 10 is thereby obtained, indicated as Pg, i.e., the value Pr has been increased by a (positive) correction power value.

Similarly, if the correction current value is negative (i.e., an excessive moisture content has been detected for the fuel cell stack 10) then as illustrated in FIG. 5, the requested current value Ir is reduced by the correction current value, and the requested power value Pr is accordingly reduced by applying a (negative) correction power value determined by the I-P characteristic that has been read out, to become the actually power value Pg that is to be generated by the fuel cell stack 10.

Thus, referring again to the flow diagram of FIGS. 3A, 3B the I-P characteristic corresponding to the detected moisture content is utilized in step S202, in conjunction with the requested power value (Pr) to obtain the corresponding requested value of current (Ir), then in step S203 the amount of power (Pg) that must actually be generated by the fuel cell stack 10 is calculated by using the I-P characteristic to apply a correction power value to the requested power value.

A decision is then made (step S204) as to whether the correction power value is positive. If so (a Y decision) then step S205 is executed, in which a decision is made as to whether or not the permissible charging power for the secondary battery 12 is greater than the correction power value. If the permissible charging power exceeds the correction power value (a Y decision in step S205) then the value of power that is actually to be generated by the fuel cell stack 10 is set as the sum of the requested power value (Pr) and the correction power value (step S206).

However if the permissible charging power is less than the correction power value (a N decision in step S205) then since in that case it is not possible to attain the entire correction power value by charging the secondary battery 12, the correction power value is reduced accordingly, i.e., it is made equal to the permissible charging power for the secondary battery 12 (step S208). The value of power that is actually to be generated by the fuel cell stack 10 is then set as the sum of the requested power value (Pr) and the (modified) correction power value, in step S206.

As a result of that sequence of operations, control of the moisture content can be achieved by controlling a level of correction current produced by the fuel cell stack 10 (i.e., which is additional to the current which is supplied to the electrical load 11), within a range of currents extending up to a maximum value which is determined by the maximum permissible amount of power than can be applied to charge the secondary battery 12. That permissible charging power depends upon the state of charge of the secondary battery 12, and that state of charge is continuously monitored by the battery charge status detection section 70, which thereby supplies information to the control section 40 indicative of the permissible charging power.

Next (step S207) the amount of power that will be applied to charge the battery (by the power distribution controller 13) is set as the correction power value.

If it is found in step S204 that the correction power value is negative, then in step S209 a decision is made as to whether or not the permissible discharging power for the secondary battery 12 is greater than the absolute value of the correction power. If the permissible discharging power exceeds the absolute correction power value (Y in step S209) then the value of power that is actually to be generated by the fuel cell stack 10 is obtained by subtracting the absolute correction power value, i.e., in this case the permissible discharging power value, from the requested power value (step S210).

However if the permissible discharging power of the secondary battery 12 does not exceed the absolute correction power value (a N decision in step S209) then since in that case it is not possible to attain the entire correction power value by (i.e., reduction of the power generated by the electrical load 11) by using supplemental power that is obtained by discharging the secondary battery 12, the absolute correction power value is set as the permissible discharging power value (step S211). Step S210 is then executed as described above, using that absolute correction power value.

In step S212, the amount of power that will be applied to charge the battery is set as the absolute correction power value.

It can thus be understood that with the current Control operation of this embodiment, the moisture content status of the fuel cell stack 10 is monitored and the level of current produced by the fuel cell stack 10 is increased (beyond the level of current which must be supplied to the electrical load 11) or is reduced (below the level of current which must be supplied to the electrical load 11) in accordance with whether it is necessary to increase or to decrease the rate of production of water within the fuel cell stack 10. In that way, the moisture content in the interiors of the cells of the fuel cell stack 10 can be maintained at an optimum level.

Furthermore when the power that is to be generated by the fuel cell stack 10 exceeds the amount of power that is to be supplied to the electrical load 11 (i.e., when it is required to increase the current produced by the electrical load 11 to thereby increase the moisture content) then excess power is supplied, as far as possible, to charge the secondary battery 12 (so that the required increase in current from the fuel cell stack 10 can thereby be achieved as far as possible). Conversely, when the power that is to be generated by the fuel cell stack 10 is less than the amount of power that is to be supplied to the electrical load 11, then supplementary power is obtained as far as is permissible by discharging the secondary battery 12 (so that the required decrease in the current produced by the fuel stack 10 can thereby be achieved as far as possible).

In that way, the amount of power supplied to the load can be maintained at a requisite level, in spite of adjustments being made to the level of current produced by the fuel cell stack 10 so that the interior of the fuel cell stack 10 can be maintained at a suitable condition of moisture content.

Second Embodiment

Figure 6:
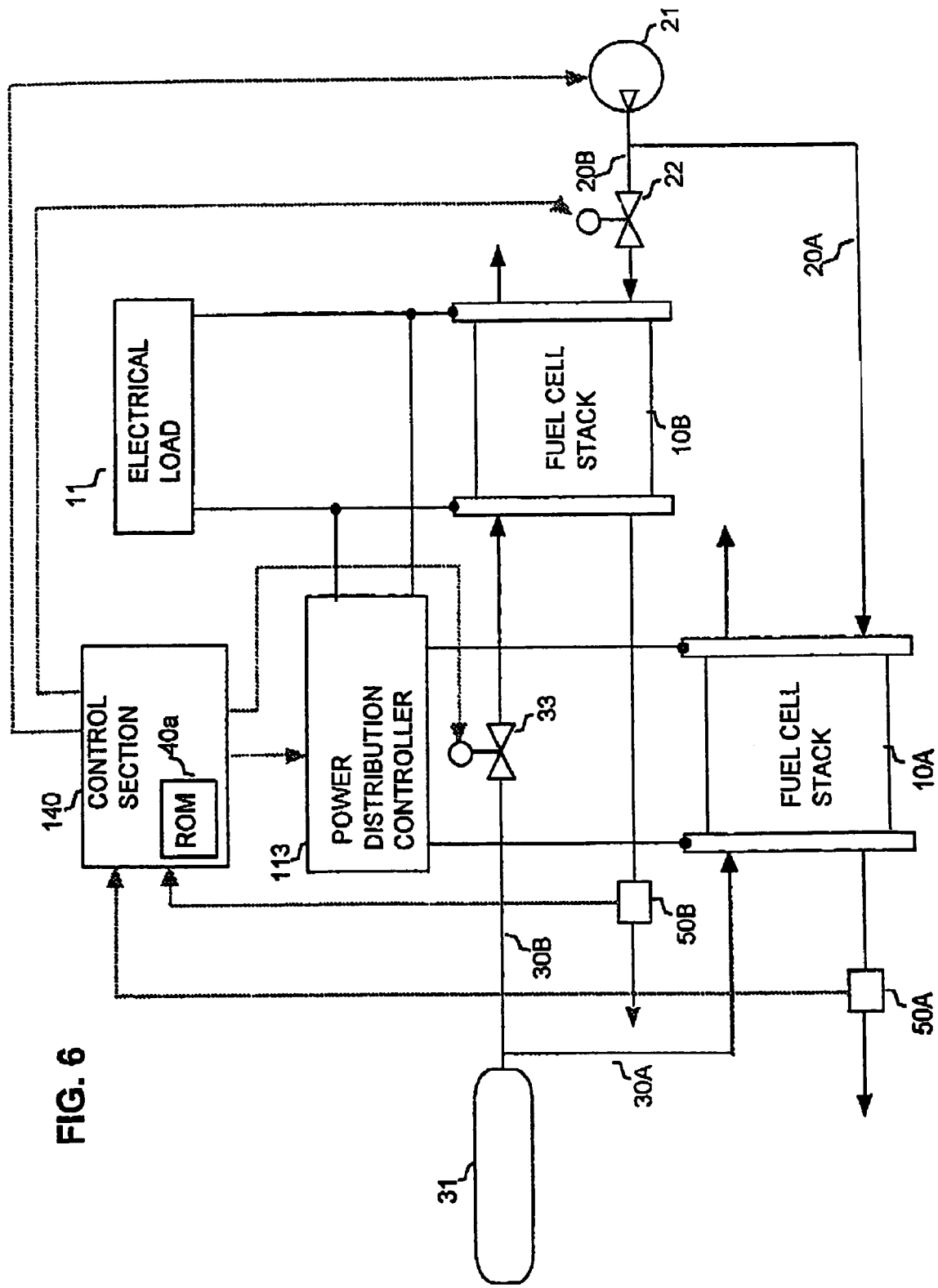
FIG. 6 is a conceptual system diagram of a second embodiment of a fuel cell system, utilizing a plurality of separately controlled fuel cell stacks.
Figure 7B:
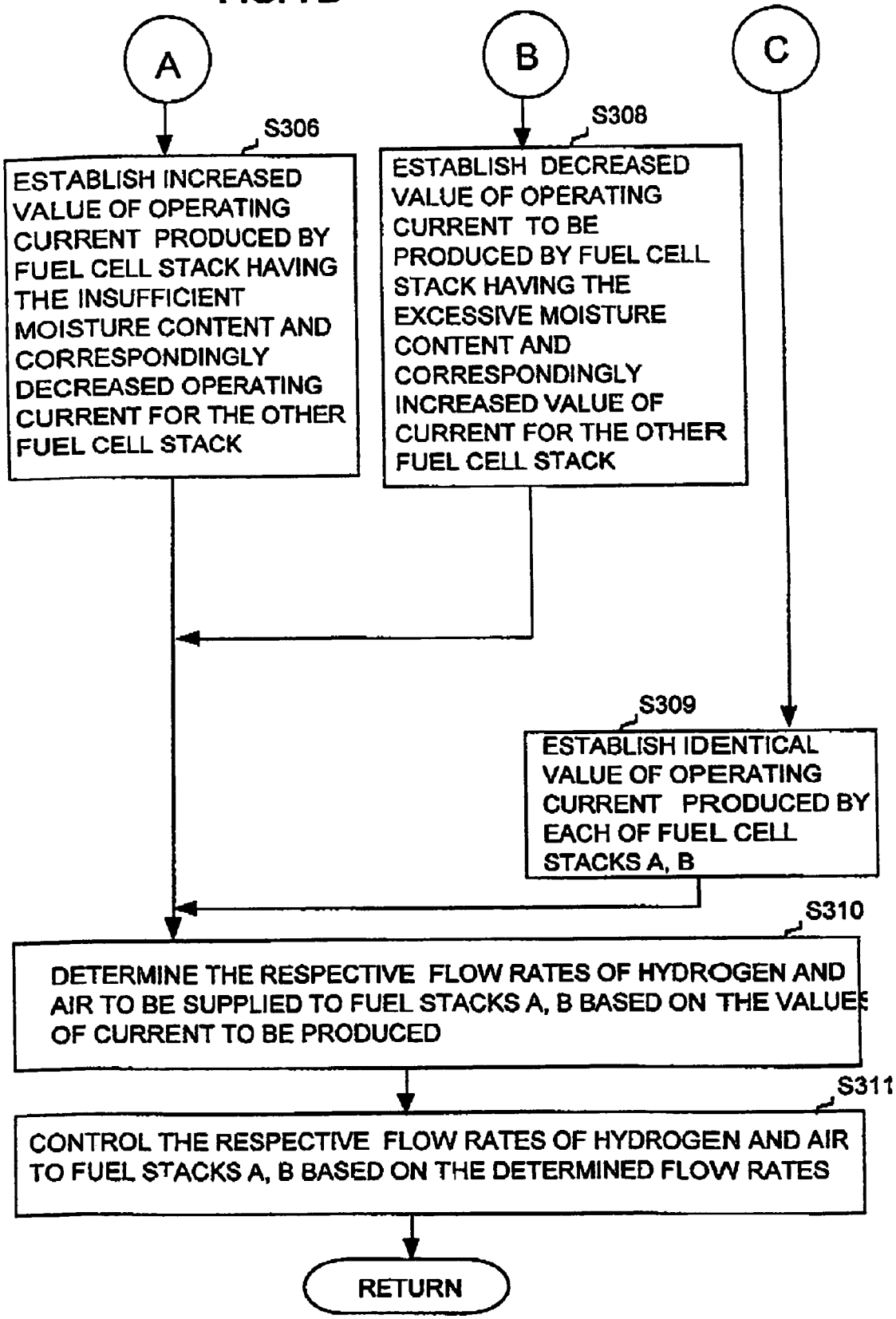

A second embodiment of a fuel cell system will be described referring to FIG. 6 and FIGS. 7A, 7B. FIG. 6 is a conceptual system diagram of this embodiment, in which components corresponding to those of the embodiment of FIG. 1 are designated by identical reference numerals to those of FIG. 1, with further description of these being omitted. The system is based on two fuel cell stacks 10A, 10B, which are respectively separately controlled. Overall control of the system is performed by a control section 140, which controls each of the compressor 21, air distribution adjustment valve 22, hydrogen distribution adjustment valve 33 and power distribution controller 13. The flow of air from the compressor 21 is divided into two paths, at a location upstream from the air distribution adjustment valve 22 and the fuel cell stacks 10A, 10B, i.e., a flow path 20A which supplies a flow of air to the fuel cell stack 10A, and a flow path 20B which supplies a flow of air to the fuel cell stack 10B via the air distribution adjustment valve 22. The air distribution adjustment valve 22 is controlled by the control section 140 to adjust the proportions in which the air flow from the compressor 21 is supplied to the fuel cell stacks 10A, 10B respectively.

Similarly, the flow of hydrogen from the hydrogen gas cylinder 31 is divided into two paths, at a location upstream from the hydrogen distribution adjustment valve 33 and the fuel cell stacks 10A, 10B, i.e., a flow path 30A which supplies a flow of hydrogen to the fuel cell stack 10A, and a flow path 30B which supplies a flow of hydrogen to the fuel cell stack 10B via the hydrogen distribution adjustment valve 33. The hydrogen distribution adjustment valve 33 is controlled by the control section 140 to adjust the proportions in which the hydrogen flow from the hydrogen gas cylinder 31 is supplied to the fuel cell stacks 10A, 10B. The rate of that flow of hydrogen is determined by the flow rate adjustment valve 32.

Moisture content sensors 50A, 50B are provided at the air exhaust outlets from the fuel cell stacks 10A, 10B respectively, for monitoring the levels of moisture content in the interiors of the fuel cell stacks 10A, 10B respectively. Detection signals produced from these sensors 50a, 50B are supplied to the control section 140.

With this embodiment, the power distribution controller 113 operates under the command of the control section 140 (which performs overall system control) to control the respective values of operating current of the fuel cell stacks 10A, 10B, such that the respective values of power that are generated by the fuel cell stacks 10A, 10B, and the ratio of these values of power, are as designated by the control section 140.

In the same way as for the control section 40 of the first embodiment, the control section 140 receives signals including an accelerator opening degree signal, etc., (not shown in the drawings) which indicate the amount of power that is to be supplied to the electrical load 11 by the fuel cell stacks 10A, 10B. The control section 140 also generates various control signals for controlling the operation of the compressor 21, air distribution adjustment valve 22, flow rate adjustment valve 32, hydrogen distribution adjustment valve 33, and power distribution controller 113.

Also as for the first embodiment, the control section 140 of this embodiment incorporates a ROM 40a, having stored therein data expressing a plurality of I-P characteristics corresponding to respectively different values of moisture content of a fuel cell stack, as described above referring to FIGS. 4, 5. Hence, the control section 140 can obtain the relationship between the level of current produced by either of the fuel cell stacks 10A, 10B and the corresponding amount of power that is generated by that fuel cell stack, by utilizing the I-P characteristic corresponding to the moisture content of that fuel cell stack (as indicated by the sensor signal from the appropriate one of the moisture content sensors 50A, 50B).

A control routine that is repetitively executed by the control section 140 at periodic intervals, for controlling the levels of current produced by the fuel cell stacks 10A, 10B such as to maintain a suitable condition of moisture content in the interiors of each of the fuel cell stacks 10A, 10B respectively, will be described referring to the flow diagram constituted by FIGS. 7A, 7B. In the flow diagram, the fuel cell stacks 10A, 10B are respectively designated simply as fuel cell stack A and fuel cell stack B. Firstly, the total amount of power that must be generated by the fuel cell stacks 10A, 10B is obtained, based on the aforementioned sensor signals (accelerator opening degree, etc.) that are supplied to the control section 140 (step S301). Next, the moisture content within the fuel cell stack 10A is measured based on the output signal from the moisture amount sensor 50A (step S302), and the moisture content within the fuel cell stack 10B is measured based on the output signal from the moisture amount sensor 50B (step S303).

The respective magnitudes of the moisture content amounts obtained for the fuel cell stacks 10A, 10B are then compared (step S304), to thereby identify one of these as having the lower value of moisture content and the other as having the higher value of moisture content. Next, a decision is made as to whether or not the moisture content of the fuel cell stack having the lower value is below a predetermined lower limit value (step S305).

If the moisture content is below that lower limit value (i.e., Y decision in step S305), so that the amount of water within the fuel cell stack having the lower value of moisture content is insufficient, then (step S306) an increased value of current to be produced by that fuel cell stack is determined (to thereby increase the rate of water production within the cells of that fuel cell stack), while in addition a corresponding decreased value of current to be produced by the other fuel cell stack is established, such that the total amount of power that will be generated by the fuel cell stacks 10A, 10B will be equal to the total power value that was established in step S301.

Specifically, the control section 140 first uses the moisture content value for the fuel cell stack having the lower value of moisture content (indicated by the output signal from the corresponding one of the sensors 50a, 50B to select the appropriate one of the I-P characteristic to be read out from the ROM 40a, to thereby obtain the power value corresponding to the increased value of current. The control section 140 then similarly obtains the appropriate I-P characteristic for the other fuel cell stack, calculates the amount of power that must be generated by that stack to obtain the required total power value, then obtains the necessary current value to be produced by that other fuel cell stack, by using the I-P characteristic.

If on the other hand it is found that the moisture content of the fuel cell stack having the lower value of moisture content is not below the lower limit value, (i.e., N decision in step S305), then (step S307) a decision is made as to whether or not the moisture content of the fuel cell stack having the higher value of moisture content is above a predetermined upper limit value. If so (i.e., Y decision in step S307) then since this indicates that the interior this fuel cell stack has an excessive amount of water, a decreased value of current to be produced by that fuel cell stack is established (step S308), for thereby reducing the rate of generation of water within that fuel cell stack and so achieving drying of the interior of the fuel cell stack. In addition, a corresponding increased value of current to be generated by the other fuel cell stack is established, such that the total amount of power generated by the fuel cell stacks 10A, 10B will be equal to the value calculated in step S301, in the same way as described above for step S306.

However if its found in step S307 that the moisture content of the fuel cell stack having the higher value of moisture content is not above the upper limit value (i.e., N decision in step S307) then this indicates that both of the fuel cell stacks 10A, 10B are in a suitable moisture content condition, and so an identical value of current to be produced by each of these fuel cell stacks is established (step S309), with the I-P characteristics being used as described above to determine that value of current such that the total amount of power generated by the fuel cell stacks 10A, 10B will be equal to the power value that was established in step S301.

Upon completion of any of the steps S306, 308, 309, the respective flow rates of hydrogen and air that must be supplied to the fuel cell stacks 10A, 10B are calculated, based on the respective values of current that were established as the operating currents for the fuel cell stacks 10A, 10B (step S310).

Finally (step S311) the control section 140 applies control to the compressor 21 and the adjustment valves 22, 32, 33 to produce the requisite rates of flow of hydrogen and air that were determined in step S310.

It can thus be understood that with this embodiment, control is applied to the respective values of current that are generated by two fuel cell stacks, such as to maintain the moisture contents within the interiors of these stacks an optimum condition. It is thus made unnecessary to provide any additional apparatus such as a humidifier device for modifying the moisture content of the flow of air and/or hydrogen supplied to a fuel cell stack, in order to control the moisture content within the interior of a stack to an optimum condition.

Furthermore, due to the fact that the respective levels of current that are produced by the fuel cell stacks 10A, 10B (and respective air and hydrogen flow rates) are separately controlled, it can be ensured that the total amount of power that is supplied to a load by the fuel cell stacks 10A, 10B in combination is held at a requisite level, without fluctuations being caused by the operations for adjusting the respective values of current produced by the fuel cell stacks in order to modify the levels of moisture within them.

Third Embodiment

Figure 8:
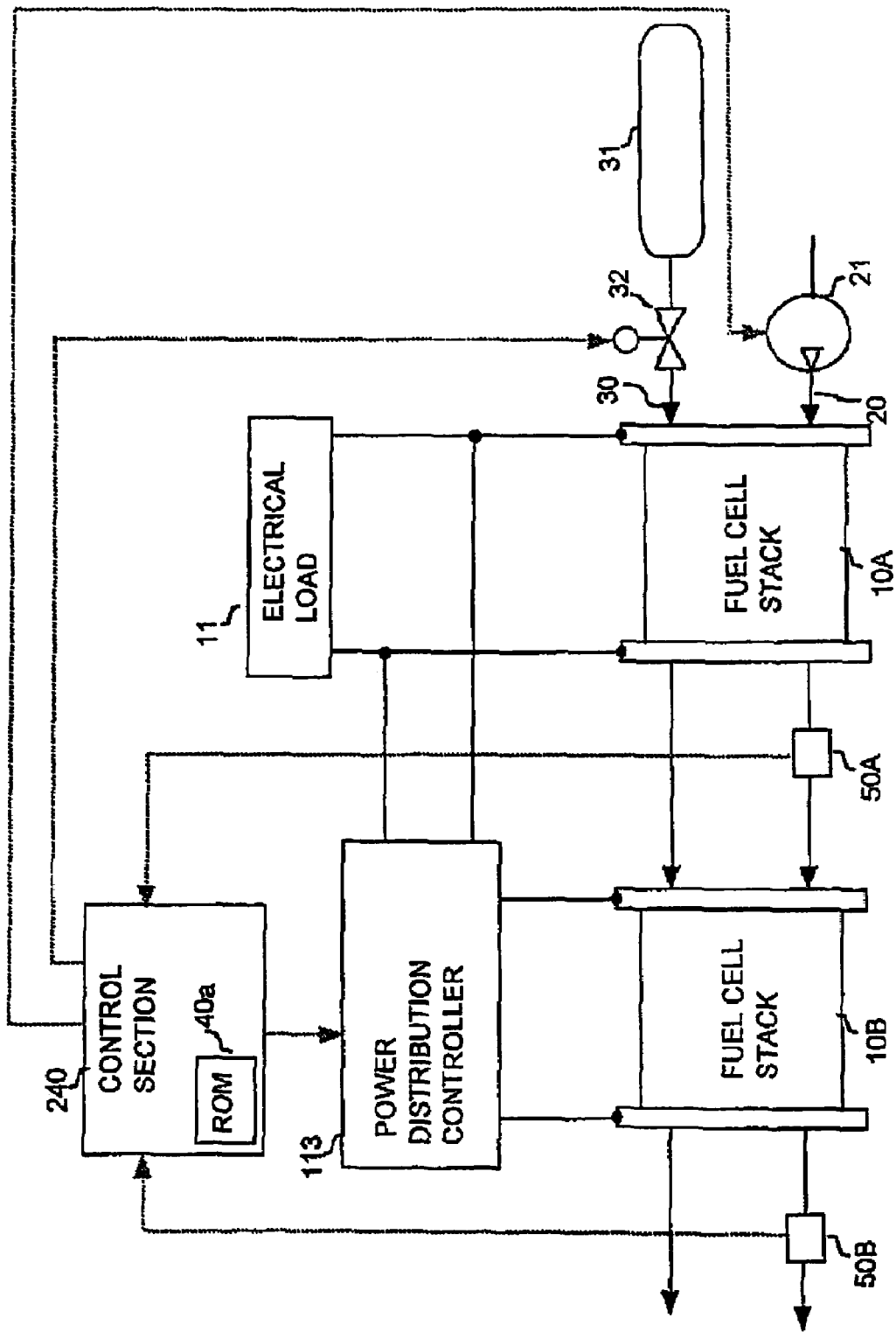
FIG. 8 is a conceptual system diagram of a third embodiment of a fuel cell system, utilizing a plurality of separately controlled fuel cell stacks; and, FIGS. 9A, 9B constitute a flow diagram of a control routine that is periodically executed by a control section of the third embodiment.

A third embodiment of a fuel cell system will be described referring to the conceptual system diagram of FIG. 8 and the flow diagram constituted by FIGS. 9A, 9B. In FIG. 8, components corresponding to those of the embodiment of FIG. 6 are designated by identical reference numerals to those of FIG. 6, with further description of these being omitted in the following. As shown in FIG. 8, the system is based on two fuel cell stacks 10A, 10B which are respectively separately controlled, with a control section 240 performing overall control of the system, including control of respective levels of power that are produced by the fuel cell stacks 10A, 10B, by supplying command signals to the power distribution controller 113 designating respective values of operating current that are to be generated by the fuel cell stacks 10A, 10B so that the required values of generated power will be achieved, and with the power distribution controller 113 performing control of the respective operating currents of the fuel cell stacks 10A, 10B as specified by the control section 240.

In the same way as for the control sections of preceding embodiments, the control section 240 of this embodiment incorporates a ROM 40a having stored therein beforehand a plurality of I-P characteristics as described hereinabove.

With this embodiment, the fuel cell stacks 10A, 10B are disposed in series along an air flow path 20 and a hydrogen flow path 30, with the fuel cell stack 10A being located upstream from the fuel cell stack 10B with respect to these flow paths. Thus the oxygen-containing gas that is supplied to the fuel cell stack 10B is the exhaust air flow from the fuel cell stack 10A, and the fuel-containing gas that is supplied to the fuel cell stack 10B is the exhaust hydrogen flow from the fuel cell stack 10A. Hence these gas flows serve to convey water, generated in the fuel cell stack 10A, to the interior of the fuel cell stack 10B, as well as hydrogen and oxygen.

Moisture content sensors 50A, 50B, are provided at the air exhaust outlets from the fuel cell stack 10A, 10B respectively, for monitoring the levels of moisture content in the interiors of the fuel cell stacks 10A, 10B respectively. Detection signals produced from these sensors 50a, 50B are supplied to the control section 240. In addition, sensor signals (accelerator opening degree, etc., not shown in the drawings) indicative of the amount of power that is required to be supplied to the electrical load 11 are also supplied to the control section 240, which acts through the power distribution controller 113 as described above to establish appropriate levels of power to be generated by the fuel cell stacks 10A, 10B respectively, in accordance with the total amount of power that has to be supplied to the electrical load 11 and the need to set appropriate levels of current produced by the fuel cell stacks 10A, 10B in accordance with their respective conditions of moisture content.

In addition, the control section 240 generates control signals that are supplied to the flow rate adjustment valve 32 and compressor 21 such as to establish appropriate flow rates of hydrogen and air along the hydrogen flow path 30 and air flow path 20 respectively in accordance with the levels of current that are to be generated by the fuel cell stacks 10A, 10B.

Figure 9A:
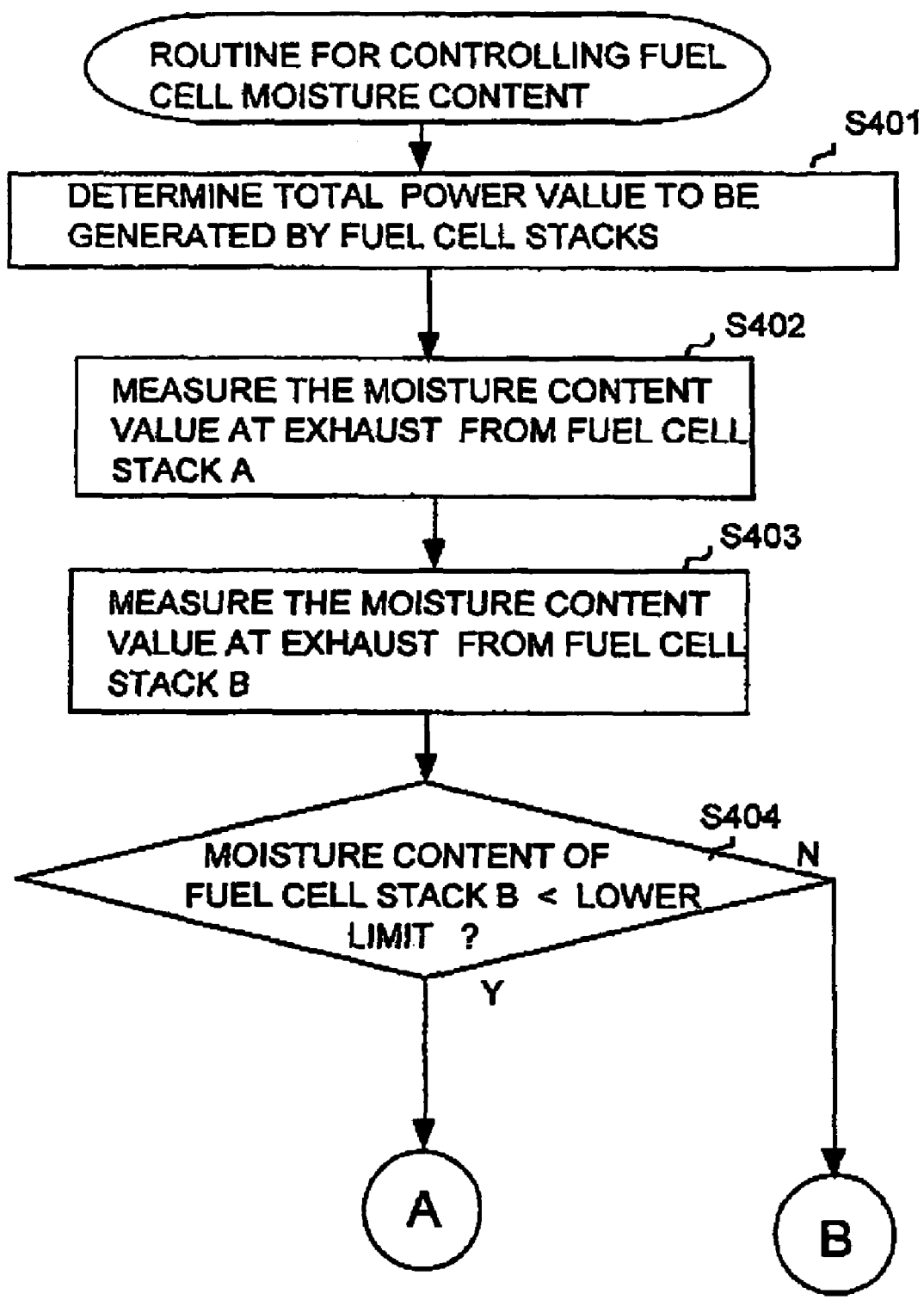
Figure 9B:
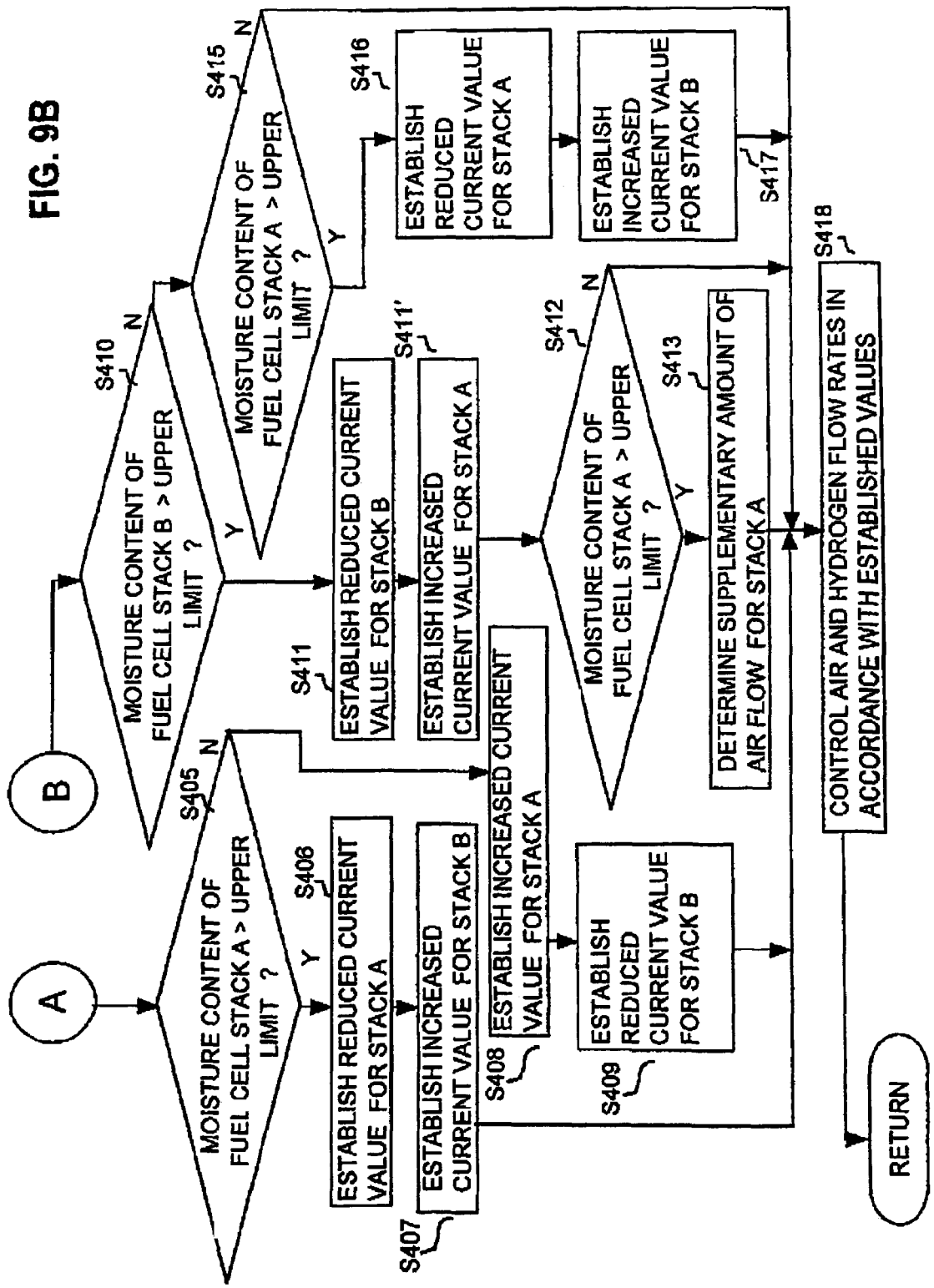

The overall control operation performed by the control section 240 will be described referring to the flow diagram of FIGS. 9A, 9B, showing a control routine that is executed repetitively by the control section 240 at fixed intervals, with the fuel cell stacks 10A, 10B being designated simply as fuel cell stack A and fuel cell stack B respectively in the flow diagram.

Firstly, the total amount of power that must be generated by the fuel cell stacks 10A, 10B is obtained, based on the aforementioned sensor signals (accelerator opening degree, etc.) that are supplied to the control section 240 (step S401). Next, the value of moisture content for the fuel cell stack 10A is measured based on the output signal from the moisture amount sensor 50A (step S402), and the value of moisture content for the fuel cell stack 10B is measured based on the output signal from the moisture amount sensor 50B (step S403). The moisture content within the fuel cell stack 10B is then diagnosed, based on the results of step S403, to determine whether or not the moisture content within the fuel cell stack 10B is below a predetermined lower limit value (step S404).

If the moisture content within the fuel cell stack 10B is found to be below the lower limit value (i.e., Y decision in step S404, then a decision is made as to whether or not the moisture content within the fuel cell stack 10A is above a predetermined upper limit value (step S405). If the moisture content is above the upper limit value (i.e., Y decision) then a reduced value of current to be produced by the fuel cell stack 10A is established (step S406) to thereby achieve drying of the interior of the fuel cell stack 10A. A correspondingly increased value of power (and hence, increased value of current) to be produced by the fuel cell stack 10B is then established, such that the total amount of power supplied to the electrical load 11 will attain the value detected in step S401 (step S407). In a similar manner to that described for the preceding embodiments, the amount of power that will be generated by the fuel cell stack 10A when producing the reduced amount of current, and the value of current to be produced by the fuel cell stack 10B in that case in order to generate the requisite increased amount of power, are determined by using the relationships between generated current and power for each of the fuel cell stacks 10A, 10B, i.e., by using I-P characteristics as shown in FIGS. 5, 6, corresponding to the moisture content levels of the fuel cell stacks 10A, 10B respectively at that time, read out from the ROM 40a.

In that case, since the current produced by the fuel cell stack 10A will be decreased in order to achieve drying of that stack, and the current produced by the fuel cell stack 10B will be increased accordingly, the rate of generation of water within the fuel cell stack 10B will be increased. Thus the moisture content of the fuel cell stack 10B will be increased, as required, since it was found in step S404 that the moisture content of the fuel cell stack 10B is insufficient.

In that way, the respective moisture contents of the fuel cell stacks 10A, 10B can be brought towards the target value, while maintaining the amount of power supplied to the electrical load 11 at the required value.

If it is found that the moisture content of the fuel cell stack 10B is below the lower limit value (i.e., N decision in step S404) but that the moisture content of the fuel cell stack 10A is not above the upper limit value (i.e., N decision in step S405) then an increased value of current to be produced by the fuel cell stack 10A is established in order to increase the rate of water generation within that stack (step S408). A correspondingly decreased value of current to be produced by the fuel cell stack 10B is then established, such that the total amount of power supplied to the electrical load 11 will attain the value established in step S401 (step S409).

In this case, due to the fact that the fuel cell stacks 10A, 10B are connected in series along the air flow path 20 and the hydrogen flow path 30, the water that is generated in the fuel cell stack 10A serves to humidify the interior of the fuel cell stack 10B, thereby helping to increase the moisture content of the polymer electrolyte in the cells of the fuel cell stack 10B.

If it is found that the moisture content of the fuel cell stack 10B is not below the lower limit value (i.e., N decision in step S404) but is above the upper limit value (i.e., Y decision in step S410) then a reduced value of current to be produced by the fuel cell stack 10B is established in order to reduce the rate of water generation and so effect drying of the interior of the fuel cell stack 10B (step S411). A correspondingly increased value of current to be produced by the fuel cell stack 10A is then established, such that the total amount of power supplied to the electrical load 11 will attain the value determined in step S401 (step S411').

A decision is made as to whether or not the moisture content of the fuel cell stack 10A is above the upper limit value (step S412). If so (i.e., Y decision) then a supplementary amount of air flow to be sent to the fuel cell stack 10A (i.e., in addition to the amount that would be required based only on the values of current that have been established in steps 411, 411') is then determined, to thereby effect drying of the interior of the fuel cell stack 10A (step S413).

However if it is found that the moisture content of the fuel cell stack 10A is not above the lower limit value (i.e., N decision in step S412) then only the operations of steps S411 and S411' are executed.

If the moisture content of the fuel cell stack 10B is appropriate (i.e., N decision in each of steps S404, S410) and the moisture content of the fuel cell stack 10A is above the upper limit value (Y decision in step S415) then the rate of generation of water in the fuel cell stack 10A is reduced by determining a reduced value of current to be produced by that stack (step S416). A correspondingly increased value of current to be produced by the fuel cell stack 10B is then established, such that the total amount of power supplied to the electrical load 11 will attain the value determined in step S401 (step S417).

Following any of the steps S407, S409, S412 or S417 (or S412 or S415, when there is a N decision), the flow rates of air and hydrogen are controlled (step S418) in accordance with the values of current that are to be produced by the fuel cell stacks 10A, 10B (with the air flow rate being increased by the supplementary amount if there has been a Y decision in step 412).

It can thus be understood that with this embodiment, due to the fact that the fuel cell stacks 10A, 10B are connected in series along the air flow path 20 and the hydrogen flow path 30, water which is generated by operation of the fuel cell stack 10A is effectively used to humidify the interior of the fuel cell stack 10B. Hence if the moisture content of the fuel cell stack 10B is insufficient, it becomes possible to increase the moisture content of the fuel cell stack 10B by increasing the operating current of the fuel cell stack 10A, and so increasing the rate at which water is produced in that fuel cell stack and supplied to the fuel cell stack 10B.

Furthermore, due to the fact that the amounts of power generated by the fuel cell stacks 10A, 10B are respectively separately controlled, it can be ensured that the total amount of power which is supplied to the electrical load 11 is held at the required value as determined by the control section 240, without fluctuations being caused by the operations for adjusting the respective values of current produced by the fuel cell stacks 10A, 10B in order to modify their levels of moisture content.

Alternative Embodiments

Although the invention has been described with respect to specific embodiments, it should be noted that various other embodiments than those described above, or modifications to the embodiments described above, could be envisaged. For example, although the first embodiment has been described for the case of using a secondary battery as an electrical energy storage device, it would be equally possible to utilize some other form of electrical energy storage device such as a capacitor.

Furthermore although the second and third embodiments above have been described for the case of using two fuel cell stacks 10A, 10B, it would be equally possible to apply the same principles to a system having three or more fuel cell stacks.

Furthermore while with the third embodiment described hereinabove the fuel cell stacks 10A, 10B are connected in series along the air flow path and the hydrogen flow path, it would be equally possible to connect these fuel cell stacks in series along only one of these two flow paths, with the fuel cell stacks 10A, 10B being connected in parallel to the other one of the flow paths.

Moreover with the first, second and third embodiments described hereinabove, it would be equally possible to dispose the moisture content sensors at the hydrogen exhaust outlets from each of the fuel cell stacks, instead of at the air exhaust outlets from the fuel cell stacks.

Furthermore with the first, second and third embodiments described hereinabove, the moisture content in the interiors of the cells of the fuel cell stacks is measured directly, i.e., based on the moisture content of the exhaust air from each fuel cell stack. However it would be equally possible to estimate the moisture content of a fuel cell stack indirectly, based on deviations between the respective values of voltage that are generated by the cells of the fuel cell stack.

What is claimed is:

1. A fuel cell system having a fuel cell generating section comprising at least one fuel cell for generating electric power by an electrochemical reaction between a fuel gas containing hydrogen and an oxidizing gas containing oxygen, fuel gas supply means for supplying a flow of fuel gas to said fuel cell generating section and oxidizing gas supply means for supplying a flow of oxidizing gas to said fuel cell generating section, wherein said system comprises:
   a controllable electric power source;
   control means for
   controlling a moisture content condition within said fuel cell generating section by adjusting said value of electric current generated by said fuel cell generating section,
   detecting a first condition whereby a value of total electric power generated by said system exceeds a required value and a second condition whereby said total value of electric power is less than said required value, and
   reducing an amount of electric power generated by said controllable electric power source when said first condition is detected and for increasing said amount of electric power generated by said controllable electric power source when said second condition is detected; and
   moisture diagnosis means for diagnosing said moisture content condition of said fuel cell generating section, wherein said control means performs control of said value of electric current based upon diagnosis results obtained by said moisture diagnosis means,
   wherein said control means performs control to supply a part of said electric power generated by said fuel cell generating section to be stored in said electrical energy storage device when said first condition is detected and to obtain electric power from said electrical energy storage device, to supplement said electric power generated by said fuel cell generating section, when said second condition is detected, and
   wherein said control means comprises means for judging, based on said diagnosis results, whether a value of moisture content within said fuel cell generating section is below a predetermined lower limit, and for applying control to increase said value of electric current generated by said fuel cell generating section when said moisture content value is found to be below said lower limit.

2. A fuel cell system as claimed in claim 1, wherein said control to increase said value of electric current generated by said fuel cell generating section is applied until said moisture content value is within a predetermined, range of values.

3. A fuel cell system as claimed in claim 1, wherein said control to decrease said value of electric current generated by said fuel cell generating section is applied until said moisture content value is within a predetermined range of values.

4. A fuel cell system having a fuel cell generating section comprising at least one fuel cell for generating electric power by an electrochemical reaction between a fuel gas containing hydrogen and an oxidizing gas containing oxygen, fuel gas supply means for supplying a flow of fuel gas to said fuel cell generating section and oxidizing gas supply means for supplying a flow of oxidizing gas to said fuel cell generating section, wherein said system comprises:
   a controllable electric power source;
   control means for
   controlling a moisture content condition within said fuel cell generating section by adjusting said value of electric current generated by said fuel cell generating section,
   detecting a first condition whereby a value of total electric power generated by said system exceeds a required value and a second condition whereby said total value of electric power is less than said required value, and
   reducing an amount of electric power generated by said controllable electric power source when said first condition is detected and for increasing said amount of electric power generated by said controllable electric power source when said second condition is detected;
   moisture diagnosis means for diagnosing said moisture content condition of said fuel cell generating section, wherein said control means performs control of said value of electric current based upon diagnosis results obtained by said moisture diagnosis means; and
   memory means having stored therein data expressing a plurality of characteristics corresponding to respectively different values of moisture content of said fuel cell generating section, each said characteristic expressing a relationship between values of electric current generated by said fuel cell generating section and corresponding values of electric power generated by said fuel cell generating section,
   wherein said control means comprises means for reading out from said memory means a characteristic that is selected as corresponding to a moisture content value derived based on said diagnosis results,
   when a specified value of electric current is to be generated by said fuel cell generating section, applying said specified value of electric current to obtain a corresponding value of electric power from said selected characteristic, as a value of electric power that is to be generated by said fuel cell generating section, and
   when a specified value of electric power is to be generated by said fuel cell generating section, applying said specified value of electric power to obtain a corresponding value of electric current from said selected characteristic, as a value of electric current that is to be generated by said fuel cell generating section.

5. A fuel cell system having a fuel cell generating section comprising at least one fuel cell for generating electric power by an electrochemical reaction between a fuel gas containing hydrogen and an oxidizing gas containing oxygen, fuel gas supply means for supplying a flow of fuel gas to said fuel cell generating section and oxidizing gas supply means for supplying a flow of oxidizing gas to said fuel cell generating section, wherein said system comprises:
   a controllable electric power source;
   control means for
   controlling a moisture content condition within said fuel cell generating section by adjusting said value of electric current generated by said fuel cell generating section,
   detecting a first condition whereby a value of total electric power generated by said system exceeds a required value and a second condition whereby said total value of electric power is less than said required value, and
   reducing an amount of electric power generated by said controllable electric power source when said first condition is detected and for increasing said amount of electric power generated by said controllable electric power source when said second condition is detected; and a plurality of fuel cell generating sections each comprising at least one fuel cell, fuel gas supply means for supplying a flow of fuel gas to each of said fuel cell generating sections, and oxidizing gas supply means for supplying a flow of oxidizing gas to each of said fuel cell generating sections, wherein said system comprises moisture diagnosis means for diagnosing respective moisture content conditions of said fuel cell generating sections, and said control means comprises:

means for judging results obtained by said moisture diagnosis means to determine a one of said fuel cell generating sections having a lowest value of moisture content, judging whether said lowest value of moisture content is below a predetermined lower limit value, and when said moisture content value is found to be below said lower limit value, increasing a value of electric current generated by said fuel cell generating section having the lowest value of moisture content, until said moisture content value is within a predetermined range of values;

means for judging results obtained by said moisture diagnosis means, to determine a one of said fuel cell generating sections having a highest value of moisture content, judging whether said highest value of moisture content exceeds a predetermined upper limit value, and when said moisture content value is found to exceed said upper limit value, applying control to decrease a value of electric current generated by said fuel cell generating section having the highest value of moisture content, until said moisture content value is within said predetermined range of values; and means operating, when said control is applied to increase or decrease a value of electric current generated by one of said fuel cell generating sections, to alter a value of electric current generated by at least one other of said fuel cell generating sections in a direction such as to adjust said total value of electric power towards said required value of electric power.

6. A fuel cell system having a fuel cell generating section comprising at least one fuel cell for generating electric power by an electrochemical reaction between a fuel gas containing hydrogen and an oxidizing gas containing oxygen, control means for controlling a value of electric current generated by said fuel cell generating section, fuel gas supply means for supplying a flow of fuel gas to said fuel cell generating section and oxidizing gas supply means for supplying a flow of oxidizing gas to said fuel cell generating section, wherein said system comprises electrical energy storage means, and said control means comprises:

means for controlling a moisture content condition within said fuel cell generating section by adjusting said value of electric current generated by said fuel cell generating section, means for detecting a first condition whereby said electric power generated by said fuel cell generating section exceeds a required value of electric power and a second condition whereby said electric power generated by said fuel cell generating section is less than said required value of electric power, and means for applying a part of said electric power generated by said fuel cell generating section to be stored in said electrical energy storage means when said first condition is detected and for obtaining electric power from said electrical energy storage means to supplement said electric power generated by said fuel cell generating section when said second condition is detected;

moisture diagnosis means for diagnosing said moisture content condition of said fuel cell generating section, and wherein said control means performs control of said value of electric current based upon diagnosis results obtained from diagnosing said moisture content condition; and wherein said control means comprises means for judging, based on said diagnosis results, whether a value of moisture content within said fuel cell generating section is below a predetermined lower limit, and for applying control to increase said value of electric current generated by said fuel cell generating section when said moisture content values is found to be below said lower limit.

7. A fuel cell system as claimed in claim 6, wherein said control to increase said value of electric current generated by said fuel cell generating section is applied until said moisture content value is within a predetermined range of values.

8. A fuel cell system having a fuel cell generating section comprising at least one fuel cell for generating electric power by an electrochemical reaction between a fuel gas containing hydrogen and an oxidizing gas containing oxygen, control means for controlling a value of electric current generated by said fuel cell generating section, fuel gas supply means for supplying a flow of fuel gas to said fuel cell generating section and oxidizing gas supply means for supplying a flow of oxidizing gas to said fuel cell generating section, wherein said system comprises electrical energy storage means, and said control means comprises:

means for controlling a moisture content condition within said fuel cell generating section by adjusting said value of electric current generated by said fuel cell generating section, means for detecting a first condition whereby said electric power generated by said fuel cell generating section exceeds a required value of electric power and a second condition whereby said electric power generated by said fuel cell generating section is less than said required value of electric power, and means for applying a part of said electric power generated by said fuel cell generating section to be stored in said electrical energy storage means when said first condition is detected and for obtaining electric power from said electrical energy storage means to supplement said electric power generated by said fuel cell generating section when said second condition is detected;

moisture diagnosis means for diagnosing said moisture content condition of said fuel cell generating section, and wherein said control means performs control of said value of electric current based upon diagnosis results obtained from diagnosing said moisture content condition; and memory means having stored therein data expressing a plurality of characteristics corresponding to respectively different values of moisture content of said fuel cell generating section, each said characteristic expressing a relationship between values of electric current generated by said fuel cell generating section and corresponding values of electric power generated by said fuel cell generating section, wherein said control means comprises means for reading out from said memory means a characteristic that is selected as corresponding to a moisture content value derived based on said diagnosis results, when a specified value of electric current is to be generated by said fuel cell generating section, applying said specified value of electric current to obtain a corresponding value of electric power from said selected characteristic, as a value of electric power that is to be generated by said fuel cell generating section, and when a specified value of electric power is to be generated by said fuel cell generating section, applying said specified value of electric power to obtain a corresponding value of electric current from said selected characteristic, as a value of electric current that is to be generated by said fuel cell generating section.

9. A fuel cell system having a plurality of fuel cell generating sections each comprising at least one fuel cell for generating electric power by an electrochemical reaction between a fuel gas containing hydrogen and an oxidizing gas containing oxygen, control means for mutually separately controlling respective values of electric current generated by said fuel cell generating sections, fuel gas supply means for supplying a flow of fuel gas to said fuel cell generating sections, oxidizing gas supply means for supplying a flow of oxidizing gas to said fuel cell generating sections, wherein said system comprises moisture diagnosis means for diagnosing respective moisture content conditions of said fuel cell generating sections, and said control means comprises means for judging results obtained by said moisture diagnosis means to determine a one of said fuel cell generating sections having a lowest value of moisture content, judging whether said lowest value of moisture content is below a predetermined lower limit value, and when said moisture content value is found to be below said lower limit value, applying control to increase a value of electric current generated by said fuel cell generating section having the lowest value of moisture content, until said moisture content value is within a predetermined range of values, judging results obtained by said moisture diagnosis means, to determine a one of said fuel cell generating sections having a highest value of moisture content, judging whether said highest value of moisture content exceeds a predetermined upper limit value, and when said moisture content value is found to exceed said upper limit value, applying control to decrease a value of electric current generated by said fuel cell generating section having the highest value of moisture content, until said moisture content value is within said predetermined range of values, and when said control is applied to increase or decrease a value of electric current generated by one of said fuel cell generating sections, altering a value of electric current generated by at least one other of said fuel cell generating sections in a direction such as to adjust a total value of electric power generated by said plurality of fuel cell generating sections towards a required value.

10. A fuel cell system as claimed in claim 9, comprising memory means having stored therein data expressing a plurality of characteristics corresponding to respectively different values of moisture content of a fuel cell generating section, each said characteristic expressing a relationship between values of electric current generated by a fuel cell generating section and corresponding values of electric power generated by said fuel cell generating section, wherein said control means comprises means for reading out from said memory means a characteristic that is selected as corresponding to a moisture content value derived based on diagnosis results obtained for a fuel cell generating section, when a specified value of electric current is to be generated by said fuel cell generating section, applying said specified value of electric current to obtain a corresponding value of electric power from said selected characteristic, as a value of electric power that is to be generated by said fuel cell generating section, and when a specified value of electric power is to be generated by said fuel cell generating section, applying said specified value of electric power to obtain a corresponding value of electric current from said selected characteristic, as a value of electric current that is to be generated by said fuel cell generating section.

* * * * *